United States Patent [19]

Manske

[11] Patent Number: 4,457,252
[45] Date of Patent: Jul. 3, 1984

[54] CRITICAL TEMPERATURE INDICATOR

[75] Inventor: Wendell J. Manske, Birchwood, Minn.

[73] Assignee: Minnesota Mining and Manufacturing Company, St. Paul, Minn.

[21] Appl. No.: 440,264

[22] Filed: Nov. 9, 1982

[51] Int. Cl.³ .............................................. G01K 11/00
[52] U.S. Cl. .................................. 116/216; 116/217; 374/159; 374/160
[58] Field of Search ............... 374/159, 160, 161, 162, 374/27; 116/216, 217, 218, 219, 207; 426/88

[56] References Cited

U.S. PATENT DOCUMENTS

| | | | |
|---|---|---|---|
| 3,055,759 | 9/1962 | Busby et al. | 426/88 |
| 3,090,236 | 5/1963 | Nicol | 374/160 |
| 3,233,459 | 2/1966 | Gleason et al. | 374/160 |
| 3,631,721 | 1/1972 | Nollen | 73/368.3 |
| 4,051,804 | 10/1977 | Garnett | 426/88 |
| 4,145,918 | 3/1979 | Couch et al. | 116/216 |
| 4,148,748 | 4/1979 | Hanlon et al. | 252/408 |
| 4,191,125 | 3/1980 | Johnson | 116/219 |

Primary Examiner—Charles Frankfort
Assistant Examiner—David R. Schuster
Attorney, Agent, or Firm—Donald M. Sell; James A. Smith; David W. Anderson

[57] ABSTRACT

A critical temperature indicator is provided utilizing the volume reduction characteristics of organic compounds as they undergo a change from the liquid state to the solid state. The bulb and a portion of the capillary tube of a thermometer-like structure contains a colorless organic compound. Another organic compound saturated with a dye, which compound has a solidification temperature lower than that of the colorless compound and which is miscible with the colorless compound, is located in the capillary tube and separated from the colorless compound by a solid, movable plug or a liquid which is immiscible with either the colorless or the dyed compound. The volume of the colorless compound upon solidification is less than the volume of the bulb so that the separating plug or liquid and at least a portion of the dyed compound are drawn into the bulb upon solidification. The dyed compound then mixes with the colorless compound to provide a visual indication that the colorless compound has solidified.

14 Claims, 3 Drawing Figures

CRITICAL TEMPERATURE INDICATOR

BACKGROUND OF THE INVENTION

1. Technical Field of the Invention

This invention relates to critical temperature indicators. More particularly, it relates to critical temperature indicators which provide an irreversible visual signal to the user that a product has been exposed to a predetermined temperature, usually near the freezing point of water.

2. Description of the Prior Art

Blood, emulsions, pharmaceuticals, beverages, and other items are often chilled in order that they may be preserved for use sometime later. However, the characteristics of these items may change so that they are undesirable for later use or the items may be rendered completely useless if exposed to a lower temperature, usually the freezing point of water. It is, therefore, desirable to provide an indicator device which will accurately show whether or not the temperature of an item or the environment has decreased below a critical value.

It is also desirable that the device provide its indication rapidly and that the indication be irreversible so that the user will be alerted to a past frozen condition, even if that condition does not presently exist.

Many critical temperature indicators have been provided which utilize the expansion characteristic of water to break a frangible ampule as, for example, Couch et al U.S. Pat. No. 4,145,918. Once the device shown in the Couch et al patent is exposed to temperatures below the freezing point of water, the volume increase as the water changes to ice causes the ampule to break. After the ice has formed and after the surrounding temperature has returned to a point above the melting point of the ice, the water is absorbed by a dye loaded pad, thus providing an indication that the device had gone through a freeze stage and back through a thaw stage.

Problems have arisen in giving an accurate indication of the passage of the device through the normal freezing point of water, i.e., 32° F. (0° C.), due to the super-cooling effect of water which will permit water in small containers to stay in its liquid state substantially below its normal freezing point. Under some conditions, water may be cooled to as low as 3.2° F. (−16° C.) without freezing. This problem has been partially overcome by the addition of certain nucleating agents to the water.

U.S. Pat. No. 4,191,125, issued to Johnson, for example, discloses that cupric sulfide powder may be used as a nucleating agent to reduce the tendency of water to super-cool. The use of such a nucleating agent, however, has not proven entirely successful since an example in the Johnson patent indicates that out of several hundred of the devices exposed to an environment at 26.6° F. (−3° C.), no devices were activated after one hour.

Such an inaccurate performance is undesirable and it is an object of this invention to provide an indicator which will avoid such inaccuracy.

SUMMARY OF THE INVENTION

A critical temperature indicator according to the present invention produces a visual, irreversible indication that the device has been subjected to a selected critical temperature.

The device includes a thermometer-like bulb and capillary tube. The bulb and a portion of the tube is filled at ambient temperatures with a colorless organic compound which is separated within the capillary tube from a dyed organic compound either by a very small amount of a liquid which is not miscible with either of the organic compounds or a solid plug. The organic compound contained in the bulb has the characteristic of undergoing a volume reduction of approximately 10 percent upon solidification and its volume at room temperature is selected so that the separating liquid or plug is drawn to the opening of the bulb, but not into the bulb, as the organic compound approaches its solidification temperature. At the solidification temperature, the organic compound in the bulb undergoes a sudden volume reduction which draws the separating liquid or plug and the dyed organic compound into the bulb. The two organic compounds mix and the bulb assumes the color of the dye. Thus, a rapid visual indication is given that the solidification temperature of the organic compound contained in the bulb has been reached. The organic compounds do not separate upon heating, so the dye remains in the bulb, thus providing an irreversible, continuous indication that the solidification temperature has been reached.

DETAILED DESCRIPTION OF THE INVENTION

Figure 1:
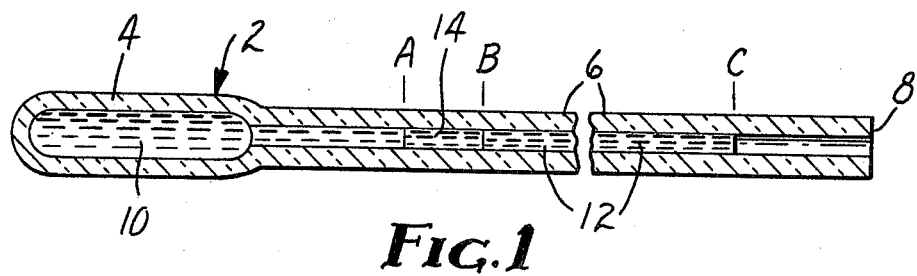
FIG. 1 is a longitudinal cross-sectional side view of a first embodiment of a critical temperature indicator according to the present invention.

Referring to FIG. 1, there is shown a critical temperature indicator according to the present invention, generally indicated by the numeral 2. The indicator 2 is thermometer-like in construction and includes a hollow bulb portion 4 and a communicating capillary tube portion 6. The bulb 4 is completely enclosed except for an opening which communicates with the capillary tube 6 and the tube 6 is open to the atmosphere at a tube opening 8 at an end of the indicator 2. The indicator 2 may be constructed of glass or plastic by conventional techniques used to construct thermometers. Constraints necessary for the construction of the indicator 2 are that the volume of the bulb 4 be significantly greater than the volume of the bore of the capillary tube 6 and that the bulb portion 4 of the indicator 2 be transparent.

Located within the bulb 4 and a portion of the tube 6 up to the line denoted "A" in FIG. 1 is an organic compound 10 which is colorless and has a desired solidification temperature. It is necessary that the colorless organic compound 10 be one which has the characteristic of undergoing a relatively large volume reduction (8 to 11 percent, preferably) upon solidification. Fatty acid esters have been found to exhibit this characteristic, and particularly suitable organic compounds along with their solidification temperatures are listed below in Table I.

TABLE I

| Organic Compound | Solidification Temperature °F. (°C.) |
| --- | --- |
| Octyl Caprylate | −1.3 (−18.5) |
| Heptyl Caprylate | 1.4 (−17) |
| Hexyl Laurate | 11.3 (−11.5) |
| Octyl Caprate | 25.7 (−3.5) |
| Butyl Myristate | 32 (0) |
| Isopropyl Myristate | 23.9 (−4.5) |
| Decyl Caprate | 42.8 (6) |
| Ethyl Myristate | 44.6 (7) |
| Isopropyl Palmitate | 50 (10) |
| Lauryl Caprate | 67.1 (19.5) |
| Butyl Stearate | 68.9 (20.5) |
| Decyl Myristate | 70.7 (21.5) |
| Octadecyl Acetate | 84.2 (29) |
| Lauryl Palmitate | 95.9 (35.5) |
| Cetyl Palmitate | 120.2 (49) |

Although the indicator 2 has been and will be described, for convenience, as operating at 32° F. (0° C.), this will be true only if butyl myristate is selected as the compound used to fill the bulb 4. The indicator 2 can be made to operate at any of the temperatures listed in Table I by substituting the corresponding chemical in the bulb 4. And since most organic compounds go through a volume reduction upon solidification, a wide range of operating temperatures is possible. Table I is provided merely to illustrate some of the possible compounds which may be used and is not intended to limit the invention to those compounds.

Between the levels of the capillary tube 6 labeled "B" and "C", there is located a second organic compound 12 in which is dissolved a dye which colors the compound 12.

The colored organic compound 12 may be any compound which is miscible with the organic compound 10 located within the bulb 4 and which has a solidification temperature lower than that of the compound 10. Any of the compounds listed in Table I are suitable and it has been found that trioctyl phosphate and bis(2-ethylhexyl) phthalate are suitable as well. The dye used to color the organic compound 12 may be any dye which is compatible with and will dissolve in the compound 12. Waxoline Violet BA, available from ICI United States, Inc., has been found to be a particularly suitable dye.

Located in the capillary tube 6 between the two organic compounds 10 and 12 and, therefore, between the limits denoted in FIG. 1 as "A" and "B", there is a liquid 14 which separates the two organic compounds 10 and 12 and prevents mixing thereof. The required characteristics of the separating liquid 14 are that its solidification temperature must be lower than that of the organic compound 10 located within the bulb 4 and that the liquid 14 be immiscible with either of the organic compounds 10 or 12. A saturated solution of nickel II nitrate in water has been found to fulfill these requirements, but perfluorocarbon compounds, which are completely fluorinated organic compounds such as those manufactured by the 3M Company under the trademark "Fluorinert", or other aqueous solutions of salts such as ammonium chloride, calcium chloride, iron chloride, lithium chloride, potassium bromide, potassium chloride, potassium iodide, sodium bromide, sodium chloride or sodium nitrate have been demonstrated to work as well. It is also contemplated that an air bubble or a solid plug of Teflon, wood, or other material could replace the separating liquid 14 so long as the plug is sized to seal but slide within the tube 6. However, the invention will be described as if a liquid is used to separate the organic compounds 10 and 12.

The volumes of the organic compounds 10 and 12 and the separating liquid 14 depend upon the dimensions of the critical temperature indicator 2 and may be accurately calculated if these dimensions are known. Because the bore diameter of the capillary portion 6 of the indicator 2 is preferably 0.020 to 0.040 inches (0.5 to 1.0 mm), these substances may not be easily injected into the indicator 2, but may be introduced by alternately heating and cooling the indicator 2 to draw the desired substance into the capillary tube 6. The preferred procedure to fill a bulb 4 having a volume of 0.006 fluid ounces (0.190 ml) and a capillary 6 having a diameter of 0.020 inches (0.5 mm) and a length of 2.36 inches (60 mm) is first to evacuate the indicator 2, immerse the opening 8 in the colorless compound 10, and allow air pressure to force the compound 10 into the indicator 2 to fill the indicator 2 completely. Second, the indicator 2 is heated to 193.1° F. (89.5° C.), the open end 8 is immersed in the desired separating liquid 14, and the temperature is lowered to 187.7° F. (86.5° C.). Third, the opening 8 is immersed in the desired dyed compound 12 and the temperature of the indicator 2 is lowered to 127.4° F. (53° C.). Fourth, the indicator 2 is removed from the dyed compound 12 and allowed to cool to room temperature. Between each step any excess liquid must be wiped from the opening 8.

The above procedure results in level "A" being 1.86 inches (47.3 mm) from the opening 8, a distance between levels "A" and "B" of 0.063 inches (1.59 mm), and a distance between levels "B" and "C" of 1.0 inch (25.4 mm).

In operation, the levels "A", "B", and "C" will maintain their positions with respect to each other, but will move either toward the tube opening 8 or the bulb 4 as the indicator 2 is heated or cooled, respectively. The volumes of the compounds 10 and 12 and the liquid 14 are such that level "C" does not move past the opening 8 of the capillary tube 6 at expected storage temperatures and level "A" approaches but does not reach the bulb 4 when the temperature of the indicator 2 is near the solidification temperature of the compound 10 located in the bulb 4. When the solidification temperature of the compound 10 in the bulb 4 is reached, the volume reduction of the compound 10 draws the separating liquid 14 and most or all of the dyed compound 12 into the bulb 4.

It is necessary that the separating liquid 14 and the dyed compound 12 have solidification temperatures lower than the colorless compound 10 so that the liquid 14 and the dyed compound 12 may be drawn into the bulb 4 rather than solidifying within the capillary tube 6.

Although the two organic compounds 10 and 12 do not immediately mix when the dyed compound 12 is drawn into the bulb 4 because the colorless compound 10 has solidified, presence of the dyed compound 12 in the bulb 4 provides a visual indication that the solidification temperature of the colorless compound 10 has been reached. When the colorless compound 10 melts, it mixes with the dyed compound 12 and thus provides an irreversible visual indication that the indicator 2 had been exposed to a temperature below the solidification temperature of the compound 10.

As an example, an indicator 2 having the dimensions indicated above and containing butyl myristate as the colorless compound 10, trioctyl phosphate colored with Waxoline Violet BA as the dyed compound 12, and a saturated aqueous solution of nickel nitrate as the separating liquid 14 to the levels described above was cooled to 39.2° F. (4° C.). At this temperature the level "B" was drawn to within 0.125 inches (3.2 mm) of the bulb 4, but no indication of freezing was provided. When the indicator 2 was cooled to 32° F. (0° C.) all of the dyed compound 12 was drawn into the bulb 4.

The above example illustrates that the indicator 2 is stable at temperatures above the solidification temperature of the colorless compound 10 and that a visual indication is provided at this solidification temperature rather than some lower temperature.

Figure 2:
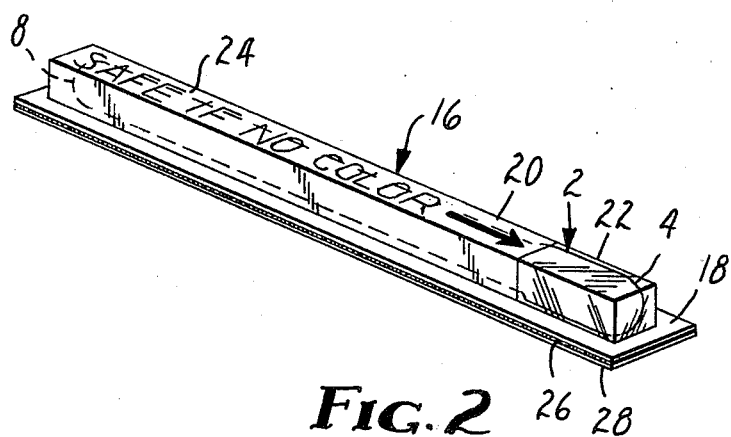
FIG. 2 is a perspective view of an indicator housing containing the critical temperature indicator of FIG. 1.

FIG. 2 illustrates a housing, generally indicated as 16, for the critical temperature indicator 2 which will allow the indicator 2 to be attached to an item to be monitored. The housing 16 includes a base 18 and a raised portion 20 which contains and protects the critical temperature indicator 2. An end 22 of the raised portion 20 is transparent to afford observation of the critical temperature indicator bulb 4. The raised portion 20 of the housing 16 further includes a legend 24 which indicates that if the bulb 4 is colorless, the solidification temperature of the compound 10 within the critical temperature indicator 2 has not yet been reached. The underside of the base 18 is coated with a pressure-sensitive adhesive 26 which is protected by a removable release liner 28. The indicator housing 16 may be attached to an article by removing the liner 28 and pressing the adhesive 26 against the article. Color within the bulb 4 will thus provide a visual indication through the transparent end 22 of the housing 16 that the article has been subjected to a temperature below the solidification temperature of the selected compound 10.

Figure 3:
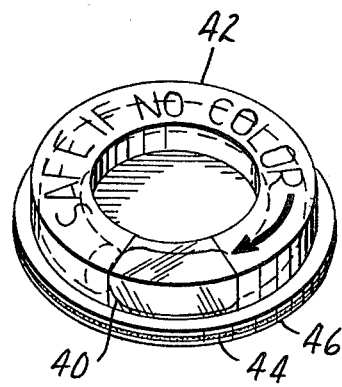
FIG. 3 is a perspective view of a second embodiment of a critical temperature indicator and housing according to the present invention.

FIG. 3 illustrates a second embodiment of a critical temperature indicator 40 which is bent into a circle and contained and protected by a circular housing 42. The housing 42 may also be attached to an article by means of a pressure-sensitive adhesive 44 which is protected by a removable liner 46. FIG. 3 illustrates that many shapes of the critical temperature indicator 2 are possible, so long as the volumetric relationship between the bulb 4 and the capillary tube 6 is retained.

Within the housings 16 and 42 will be insulating material (not shown) surrounding the capillary tube portion of the indicators 2 or 40 to prevent that portion of the compound 10 within the tube from solidifying before the compound 10 within the bulb. Preferably, the insulating material will also cushion the indicator from shock.

Although the indicator 2 has been described as providing a visual indication through the use of a dye in solution with the capillary tube compound 12, the visual indication could also be produced by providing the indicator 2 with two initially colorless compounds which produce a color when mixed.

From the foregoing descriptions of the exemplified embodiments, it will be apparent that many modifications may be made therein. It will be understood, therefore, that the embodiments are intended as illustrations of the invention only and that the invention is not limited thereto. It is intended in the appended claims to cover all such modifications as fall within the true scope of the invention.

I claim:

1. A critical temperature indicator comprising:
   a hollow bulb;
   a capillary tube communicating with said bulb;
   a colorless first liquid filling said bulb and extending into said tube which is capable of solidification and exhibits the property of volume reduction upon solidification;
   a second liquid located within said tube which is miscible with said first liquid and has a solidification temperature lower than that of said first liquid; and
   separating means interposed between said first and second liquids for preventing mixing thereof within said tube;
   the volumes of said first liquid upon solidification and said separating means being less than the volume of said bulb so that said separating means and at least a portion of said second liquid are drawn into said bulb upon solidification of said first liquid to provide a visual indication that said first liquid has solidified.

2. A critical temperature indicator according to claim 1 further including a dye in solution with said second liquid.

3. A critical temperature indicator according to claim 2 wherein said dye is Waxolene Violet BA.

4. A critical temperature indicator according to claim 1 wherein said first and second liquids are organic compounds.

5. A critical temperature indicator according to claim 4 wherein said first and second liquids are fatty acid esters.

6. A critical temperature indicator according to claim 4 wherein said first liquid is selected from the group consisting of octyl caprylate, heptyl caprylate, hexyl laurate, octyl caprate, butyl myristate, isopropyl myristate, decyl caprate, ethyl myristate, isopropyl palmitate, lauryl caprate, butyl stearate, decyl myristate, octadecyl acetate, lauryl palmitate, and cetyl palmitate.

7. A critical temperature indicator according to claim 4 wherein said second liquid is selected from the group consisting of octyl caprylate, heptyl caprylate, hexyl laurate, octyl caprate, butyl myristate, isopropyl myristate, decyl caprate, ethyl myristate, isopropyl palmitate, lauryl caprate, butyl stearate, decyl myristate, octadecyl acetate, lauryl palmitate, cetyl palmitate, trioctyl phosphate, and bis(2-ethylhexyl)phthalate.

8. A critical temperature indicator according to claim 7 further including a dye in solution with said second liquid.

9. A critical temperature indicator according to claim 8 wherein said dye is Waxolene Violet BA.

10. A critical temperature indicator according to claim 1 wherein said separating means is an aqueous salt solution.

11. A critical temperature indicator according to claim 10 wherein said salt is selected from the group consisting of ammonium chloride, calcium chloride, iron chloride, lithium chloride, potassium bromide, potassium chloride, potassium iodide, sodium bromide, sodium chloride or sodium nitrate.

12. A critical temperature indicator according to claim 1 wherein said separating means is a perfluorocarbon.

13. A critical temperature indicator according to claim 1 wherein said separating means is a saturated solution of nickel II nitrate in water.

14. A critical temperature indicator according to claim 1 wherein said separating means is a solid plug movable within said capillary tube.

* * * * *